UNITED STATES PATENT OFFICE.

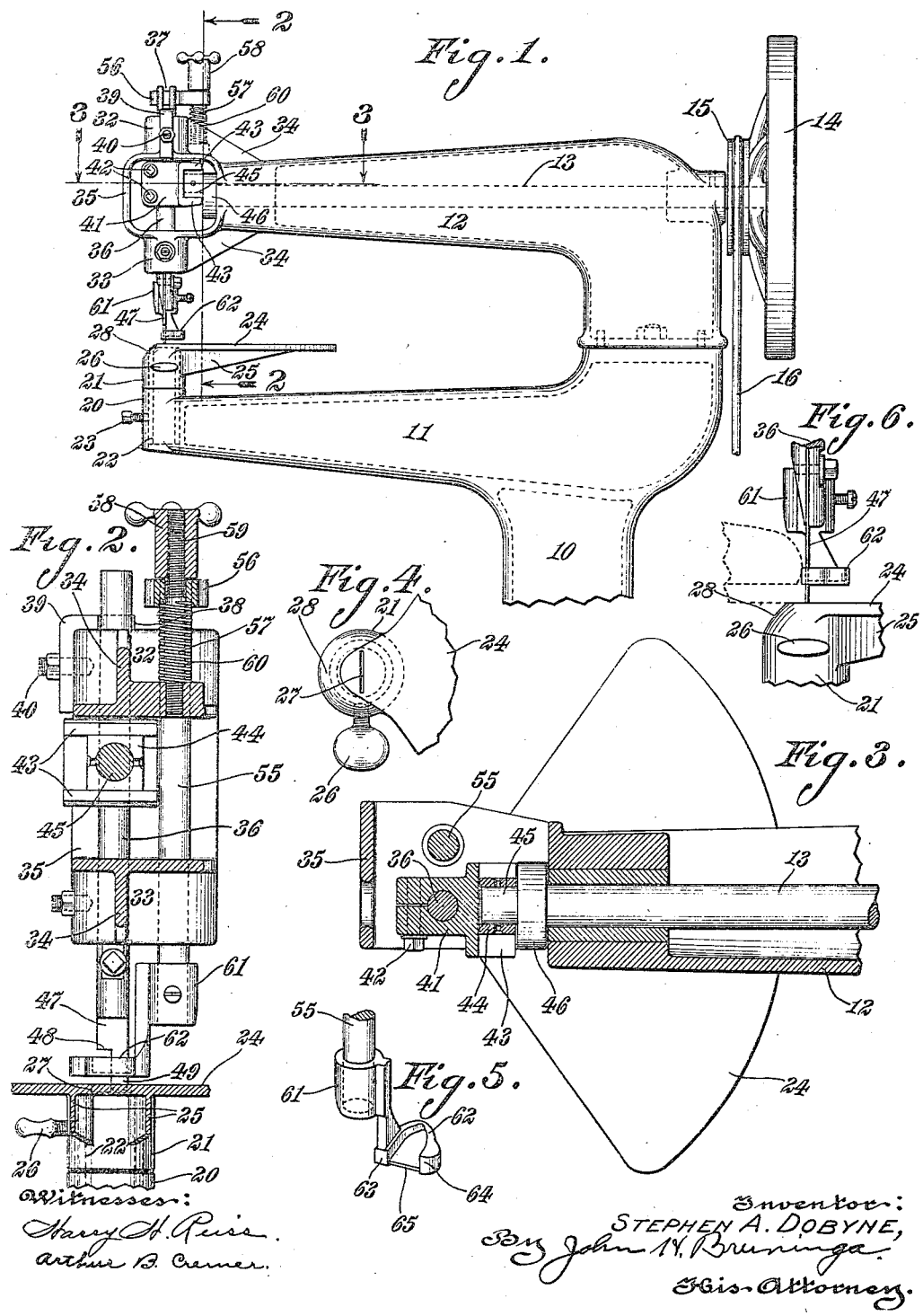
S. A. DOBYNE.
SOLE ROUNDING AND CUTTING MACHINE.
APPLICATION FILED JAN. 8, 1915.
1,245,091. Patented Oct. 30, 1917.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

SOLE ROUNDING AND CUTTING MACHINE.

1,245,091.      Specification of Letters Patent.      Patented Oct. 30, 1917.

Application filed January 8, 1915. Serial No. 1,174.

*To all whom it may concern:*

Be it known that I, STEPHEN A. DOBYNE, a citizen of the United States, and residing at St. Louis, in the State of Missouri, have invented a certain new and useful Improvement in Sole Rounding and Cutting Machines, of which the following is a specification.

This invention relates to machines for rounding or cutting shoe soles.

One of the objects of this invention is to provide a machine which can be used, either to cut the sole from stock, or rough round the sole while on the shoe.

Another object is to provide a machine in which the stock will be guided accurately when cutting the sole out of stock, and in which the shoe will be guided accurately when rounding the sole while on the shoe.

Further objects will appear from the detail description taken in connection with the accompanying drawing, in which:

Figure 1 is a side elevation of a machine embodying this invention;

Fig. 2 is an enlarged section on the line 2—2, Fig. 1;

Fig. 3 is an enlarged section on the line 3—3, Fig. 1;

Fig. 4 is an enlarged detail plan view of the table;

Fig. 5 is an enlarged detail perspective view of the presser foot; and,

Fig. 6 is an enlarged detail of Fig. 1.

Referring to the accompanying drawing, 10 designates a column or support forming a suitable base for the machine, and 11 and 12 arms, respectively integral with and secured to the column or support. The arm 12 is provided with bearings for the drive shaft 13, which has mounted thereon a fly wheel 14 and a pulley 15 driven by a belt 16 from any suitable source of power.

The arm 11 is provided with a vertical boss 20 forming a support for and engaged by a boss 21 on the work table hereinafter to be described. The boss 20 is bored to receive a vertical hollow shaft 22 entering the boss 21, and this shaft is clamped in the boss 20 by a setscrew 23, and in the boss 21 by a setscrew 26. The table 24 is of sector form, and is integral with the boss 21 and braced by webs or ribs 25. The center of the sector is approximately at the axis of the table, as shown in Fig. 4, and the table is provided, at this center point, with a slot 27. The boss 21 is beveled, as shown at 28, this bevel running up to and merging into the sides of the sector of the table.

The arm 12 has formed integral therewith a pair of bearing lugs 32 and 33 braced by webs or ribs 34, and these lugs are further connected by a yoke 35. A cutter carrier 36 is mounted for vertical movement in the bearing lugs, and this carrier is forked, as shown at 37, to receive a spline 38 on a bracket 39 secured to the lug 32 by a screw 40. The function of the spline is to hold the cutter carrier against turning while being reciprocated. A split sleeve 41 is clamped to the cutter carrier by screws 42, and this sleeve has a transverse guideway formed by a pair of ribs 43 to receive a block 44 on a crank pin 45 mounted on a crank disk 46 fixed to the shaft 13. The cutter carrier has mounted thereon a cutter blade 47 having a transverse cutting edge 48 and a projecting part 49 normally positioned in the slot 27. This cutter blade coöperates with the slot 27 to cut the material. This cutter blade and its method of operation are fully described in U. S. Patent #1,067,165, July 8, 1913.

A presser foot shank 55 is mounted for vertical movement in the lugs 32 and 33, and this presser foot has fixed to its upper end a head 56 sliding on a pin 57. A nut 58 engages the threaded part 59 of the pin 57, and a spring 60 encircles the pin and bears against the head 56. The presser foot shank has mounted thereon a collar 61 provided with a presser foot 62. This presser foot has gaging faces 63 and 64, and a web 65 which braces the cutter blade 47.

The operation of this machine is as follows: Rotation of the drive shaft 13 will vibrate the cutter vertically. During the operation of the cutter the cutting is performed by the cutting edge 48, while the projection 49 enters the kerf made by the cutter, and thus facilitates the guiding of the material. During the operation of the cutter, the presser foot is set down on the work so as to hold the work against movement.

In order to round a shoe sole, the shoe is placed with its sole down on the table, with the presser foot bearing on the sole, and with the upper bearing against the gaging faces 63 and 64 on the presser foot. As the shoe is now moved past the cutter, this shoe is guided by the engagement of the presser foot with the upper, so as to accurately round the sole. The presser foot also acts as a brace for bracing the cutter. As this device is especially designed for repair work in which the sole must be rounded while the heel is on the shoe, difficulties are ordinarily encountered when it is desired to round the sole close to the heel breast. In accordance with this invention, however, the beveling of the table at 28, and the sector form of the table permit the sole to be rounded close up to the heel breast.

When it is desired to cut soles from stock, the stock is laid on the table, and the cutter can then be readily made to follow the outline of the sole on the stock, especially since the projection 49, which moves in the kerf, facilitates guiding. When desired, the table may be swung around through 180 degrees of its present position.

It is obvious that various changes may be made in the details of construction without departing from the spirit of this invention. It is, therefore, to be understood that this invention is not to be limited to the specific construction shown and described.

Having thus described the invention, what is claimed is:

1. In a sole cutting machine, a support, a work table of sector form mounted on said support, and a vibrating cutter operating with said table at the intersection of the sides of the sector, the plane of the sector being disposed transversely of the line of cut.

2. In a sole cutting machine, a support, a work table of sector form mounted on said support, and a vibrating cutter operating with said table at the intersection of the sides of the sector, the plane of the sector being disposed transversely of the line of cut and said table being movable on said support about the line of movement of said cutter.

3. In a sole cutting machine, a support, a work table of sector form mounted on said support, a vibrating cutter operating with said table at the intersection of the sides of the sector, the plane of the sector being disposed transversely of the line of cut and said table being movable on said support about the line of movement of said cutter, and means for locking said table in its different adjusted positions.

4. In a sole cutting machine, a support, a horizontal work table of sector form mounted on said support, and a cutter operating with said table at the intersection of the sides of the sector, the plane of the sector being disposed transversely of the line of cut and said table having its surface beveled adjacent said cutter for the purpose set forth.

5. In a sole cutting machine, a support, a work table of sector form mounted on said support, said table having a slot at the intersection of the sides of said sector and the edge of said table being beveled adjacent said slot, and a vibrating cutter moving in said slot, the plane of the sector being disposed transversely of the line of cut.

6. In a sole cutting machine, a support, a work table of sector form mounted on said support, said table having a slot at the intersection of the sides of said sector and the edge of said table being beveled adjacent said slot, a vibrating cutter moving in said slot, and a presser-foot coöperating with said table, the plane of the sector being disposed transversely of the line of cut.

In testimony whereof I affix my signature in the presence of these two witnesses.

STEPHEN A. DOBYNE.

Witnesses:
B. F. WATKINS,
GEORGE AUSTIN.